Patented Apr. 23, 1929.

1,710,508

UNITED STATES PATENT OFFICE.

CHARLES E. NORTH, OF MONTCLAIR, NEW JERSEY, ASSIGNOR TO DAIRY DRINK COMPANY, OF CHICAGO, ILLINOIS, A CORPORATION OF ILLINOIS.

PROCESS OF MAKING MIXTURES OF COCOA OR CHOCOLATE AND MILK.

No Drawing. Original application filed August 15, 1925, Serial No. 50,485. Divided and this application filed March 13, 1926. Serial No. 94,594.

This application is a division of my application filed August 15, 1925, Serial No. 50,485, for process for making mixtures of cocoa or chocolate and milk and product thereof.

Beverages comprising a mixture of cocoa and milk or chocolate and milk have frequently been made in the home on a small scale and usually have been drunk approximately when made. Such beverages have also been made commercially on a factory scale, but, so far as I am aware, difficulties have been experienced in producing such beverages because the cocoa or chocolate has settled at the bottom of and the butter fat has risen to the top in the mixture if the same is kept for any considerable length of time. The use of milk as the greater part of such beverages naturally brings the manufacture thereof within the scope of the business of large milk dealers, but the use of cocoa is so unfamiliar to the milk industry that the preparation of the cocoa portion of the milk is largely in the hands of those more familiar with cocoa and its properties.

On a commercial scale milk and cocoa mixtures have been marketed in glass bottles. The time required for mixing, bottling, shipping and distributing the beverages may occupy a day or more. Commercially the cocoa-milk mixtures are usually cooled and designed to be consumed in a condition which is cool rather than as the hot cocoa of home production, although such commercial mixtures may be heated if desired. The time required for the manufacture of the mixtures by the milk dealer causes certain changes in the commercial product not obvious in the hot home-made cocoa-milk beverages. The mixing of the cocoa and milk or chocolate and milk, bottling and marketing of the mixtures has been performed for the most part on a commercial scale by large milk dealers as a branch of their business. The cocoa has been obtained by them in the form of a syrup which is supplied by dealers in cocoa or in cocoa-syrup. Such syrup comprises cocoa, sugar and water so mixed and proportioned that it has been only necessary to add the amount specified on the labels of the cans of syrup to the amount of whole fluid milk also specified, whereupon the syrup and the milk have been mixed, pasteurized, homogenized, cooled and bottled and marketed within a few hours or days after the bottling. Instead of using the syrup referred to as purchased on the market the milk dealer may make his own syrup, or he may make a mixture of cocoa or chocolate and milk in desired proportion in the usual way but on a commercial scale.

The most serious difficulties encountered by those promoting on a commercial scale the sales of cocoa and milk mixtures or chocolate and milk mixtures for beverages is the separation of the fat of the milk which rises to the top of the mixtures and the separation of the cocoa which falls by gravity to the bottom of the mixtures. The specific gravity of whole milk is 1.029. Since the specific gravity of milk fat is 0.960 and of cocoa 1.470 it will be apparent that milk fat is about 8% lighter than milk and cocoa is about 44% heavier than milk. As a consequence, if the mixture stands for only an hour or two a layer of milk fat can be seen on the top and a layer of cocoa on the bottom of the mixture in glass bottles. After standing over night there may be a layer as thick as an inch or more of creamy fat on top of the mixture and a layer as thick as a half inch of dark brown cocoa or chocolate at the bottom of such mixture referred to. Such separation of the fat and cocoa or chocolate from the mixtures impairs the market-ability thereof. It has been proposed, as a remedy for the separation of the milk fat and cocoa or chocolate in such mixtures, to pass the mixture through a machine called a homogenizer by means of which the fat globules are broken up into such fine particles as to remain in suspension in the milk and fail to rise. Such machines are expensive to buy and to operate, as they comprise a series of heavy pumps compressing the liquid under pressures ranging from 1500 to 6000 pounds to the square inch. Such machines have no effect on the cocoa or chocolate so far as keeping it from precipitating in the mixtures is concerned for the reason that cocoa does not consist of fat globules but of starchy and fibrous material. As a consequence, the treatment of the mixtures by homogenizers still leaves the mixtures in a condition in which the cocoa quickly settles to the bottom forming a brown sediment.

The object of my invention is to so treat or prepare one of the ingredients of the cocoa-milk or chocolate-milk mixtures as to prevent the rising of the fat globules to the surface and the depositing of the cocoa or chocolate at the bottom of the mixture without regard to the time of retaining the mixture for use.

In this specification I use the term "cocoa" as including commercial cocoa or chocolate or an equivalent edible solid material, and I also use the term "milk" as including whole milk and skim milk.

In carrying out my invention I increase the normal friction between the milk liquid and the more solid materials or ingredients of my improved beverage, such as the butter fat or the particles of cocoa, or both, to such a degree as will maintain the fat and the solid material in suspension in the liquid. I accomplish the foregoing by increasing the friction or viscosity of the milk liquid against the surfaces of the particles of fat and the particles of cocoa to such an extent that their respective motions upwards or downwards in the mixture due to their differences in specific gravity from the gravity of the liquid is overcome. The friction of the liquid against the surfaces of the particles of fat or of solid material in the mixture is in direct proportion to the viscosity of the liquid, by which I mean the thickness or stickiness or tenacity of the liquid. If the viscosity of water is represented by 1.0 the viscosity of normal fluid milk is 1.8. I change the solids of the milk itself so that from a liquid form they assume a more solid form and increase the viscosity of the milk. By the application of very high heat (240° F.) and pressure (15 lbs. to the sq. in.) to milk the casein and albumen of milk may be made to assume a creamy and jelly-like form, after which the cocoa and sugar are added to the milk. In such way the viscosity of milk may be increased at will and such increases in viscosity may be graduated and their effect on the rising of milk fat and the descent of cocoa in the mixture may be noted. The motion of fat particles upward and of the cocoa particles downward in a mixture of milk and cocoa is fast or slow, and such motions cannot, so far as I am aware, be brought absolutely to a standstill without an increase in viscosity so great that the liquid in which these particles is suspended is absolutely rigid, as it would be if frozen. On the other hand, however, the friction can be increased sufficiently to make the movement of the particles so slow that no separations serious enough to impair the commercial value of such mixtures will take place for days or even weeks. I have discovered the precise points at which the viscosity and hence the friction is sufficient to prevent the rising of the fat to the top of such mixtures for twenty-four hours. The point for fat is 2.2, which means 2.2 times as viscous as water. I have also discovered the degree of viscosity and hence of friction necessary to prevent the settling of cocoa to the bottom of the mixtures of cocoa and milk for twenty-four hours. This is a viscosity of 2.5, which means a viscosity $2\frac{1}{2}$ times as viscous as water.

Since the syrup as usually marketed is of a bulk occupying 25% of the finished product the syrup may consists of:

| | Per cent. |
|---|---|
| Cocoa | 8 |
| Sugar | 16 |
| Thickener | 2 |
| Water | 74 |
| Total | 100 |

The use of heat for increasing the viscosity of milk is novel, because two of the solids, not fat, are affected but in a peculiar way. The albumen in cow's milk amounting to .5% of the whole and $4\frac{1}{16}$% of the solids is coagulated by heat of from 145° F. to 150° F. Casein which amounts to 3.5% of the whole milk and $29\frac{1}{6}$% of the solids is coagulated into a jelly-like mass at temperatures from 220° F. to 250° F., which may be most conveniently produced by placing the milk in closed containers and heating the same by steam under pressure. I have found that the application of heat to milk at temperatures of 145° F. to that of boiling (212° F.), in addition to the coagulation of albumen also affects the fat globules by breaking up their clusters, so that instead of clustering in small groups the fat globules become more evenly distributed as scattered individuals. This exposes the entire surfaces of the fat globules to the action of friction of the milk liquid and such friction is increased by coagulation of the albumen of the milk, and as a consequence of these two factors in milks heated to from 145° F. to 212° F. the rising of fat in the form of cream is greatly diminished. There is no such effect on the cocoa in cocoa and milk mixtures because of the much greater difference between the specific gravity of cocoa and of milk and the fact that the increase in viscosity by the coagulation of milk albumen alone is not enough to prevent the falling of the cocoa fibers in the mixture. When the temperature of the milk is raised above 220° F., (in practice I use 240° F. for about thirty minutes), and the casein is coagulated into a jelly-like mass the increase in viscosity of the milk becomes so great that its friction on cocoa fibers, which I add to such milk, brings them almost to a standstill. Under such conditions motion of the cocoa fibers is so slow that they remain in suspension in the mixture for days or even weeks. For the purpose of subjecting the milk to such high temperatures and pressures the milk may be placed in glass bottles or tins or any convenient form of container, such as ordinary 40 quart milk cans. The ordinary type of steam chest or sterilizer may be used for the purpose of heating. The syrup may be added to the treated milk before or after the latter has cooled to atmospheric temperature, in which case it would be preferable to suitably stir or agitate the mixture.

The effect of such high temperature and pressure as 240° F. and 15 lbs. to the square inch for a period of about thirty minutes is not only to change the nature of the albumen and casein and increase the viscosity of milk but also to kill all bacteria, yeasts and moulds in such milk. In short, the high temperatures and pressures sterilize the milk and by sterilization entirely remove its perishibility so far as the growth of micro-organisms is concerned. As a consequence when proper care is taken to provide containers which are sealed so as to permit no risk of contamination the milk so treated does not decompose.

The manufacturer may heat milk or skim milk in open vessels such as pails, or cans, or tanks, by placing these in steam pressure chests such as those employed in the canning industry and after heating the contents to 240° F. at a pressure of 15 lbs. to the square inch for between twenty-five and thirty minutes he may then remove the milk from the pressure chest and mix cocoa or chocolate and sugar with the same and place the mixture in his final containers, such as cans and bottles. By such practice he would obtain mixtures which will not separate but would sacrifice some of the advantages of sterilization and keeping qualities for a wider choice of containers and of closures for the same.

The proportions of milk and cocoa suitable for a beverage may be three quarts of milk to one quart of cocoa-syrup.

Having now described my invention what I claim is:—

That step in the method of producing a cocoa and milk mixture which consists in heating milk to a temperature of about 240° F. at a pressure of about 15 lbs. to the square inch for a period of about thirty minutes to coagulate and thicken and increase the normal friction of the milk, and adding to the milk cocoa and sugar, whereby the cocoa will remain in suspension in the milk.

CHARLES E. NORTH.